(12) United States Patent
Schaul et al.

(10) Patent No.: US 10,282,662 B2
(45) Date of Patent: May 7, 2019

(54) TRAINING NEURAL NETWORKS USING A PRIORITIZED EXPERIENCE MEMORY

(71) Applicant: DeepMind Technologies Limited, London (GB)

(72) Inventors: Tom Schaul, London (GB); John Quan, London (GB); David Silver, Hitchin (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 15/977,891

(22) Filed: May 11, 2018

(65) Prior Publication Data
US 2018/0260707 A1  Sep. 13, 2018

Related U.S. Application Data

(63) Continuation of application No. 15/349,894, filed on Nov. 11, 2016.

(60) Provisional application No. 62/254,610, filed on Nov. 12, 2015.

(51) Int. Cl.
*G06N 3/08* (2006.01)
(52) U.S. Cl.
CPC .............. *G06N 3/08* (2013.01); *G06N 3/088* (2013.01); *Y04S 10/54* (2013.01)
(58) Field of Classification Search
None
See application file for complete search history.

(56) References Cited

U.S. PATENT DOCUMENTS 6,473,851 B1 * 10/2002 Plutowski ............ G06N 99/005
706/1

FOREIGN PATENT DOCUMENTS

WO  WO 2015/054264  4/2015

OTHER PUBLICATIONS

Mnih, Volodymyr, et al. "Playing atari with deep reinforcement learning." arXiv preprint arXiv:1312.5602 (2013).*
Narasimhan, Karthik, Tejas Kulkarni, and Regina Barzilay. "Language understanding for text-based games using deep reinforcement learning." arXiv preprint arXiv:1506.08941(2015).*
(Continued)

*Primary Examiner* — Eric Nilsson
(74) *Attorney, Agent, or Firm* — Fish & Richardson P.C.

(57) ABSTRACT

Methods, systems, and apparatus, including computer programs encoded on a computer storage medium, for training a neural network used to select actions performed by a reinforcement learning agent interacting with an environment. In one aspect, a method includes maintaining a replay memory, where the replay memory stores pieces of experience data generated as a result of the reinforcement learning agent interacting with the environment. Each piece of experience data is associated with a respective expected learning progress measure that is a measure of an expected amount of progress made in the training of the neural network if the neural network is trained on the piece of experience data. The method further includes selecting a piece of experience data from the replay memory by prioritizing for selection pieces of experience data having relatively higher expected learning progress measures and training the neural network on the selected piece of experience data.

20 Claims, 4 Drawing Sheets

(56) References Cited

OTHER PUBLICATIONS

Maei, Hamid Reza, et al. "Toward off-policy learning control with function approximation." ICML. 2010.*
Kaelbling, Leslie Pack, Michael L. Littman, and Andrew W. Moore. "Reinforcement learning: A survey." Journal of artificial intelligence research 4 (1996): 237-285. (Year: 1996).*
Andre et al., "Generalized prioritized sweeping," In Advances in Neural Information Processing Systems. Citeseer, 1998, 7 pages.
Atherton et al., "Memory trace replay: the shaping of memory consolidation by neuromodulation," Trends in neurosciences, Sep. 2015, 38(9):560-70.
Bellemare et al., "Increasing the action gap: New operators for reinforcement learning," Proceedings of the AAAI Conference on Artificial Intelligence. 2016, 8 pages.
Bellemare et al., "The arcade learning environment: An evaluation platform for general agents," arXiv preprint arXiv:/207.4708, 2013, 27 pages.
Collobert et al., "Torch7: A matlab-like environment for machine learning," BigLearn, NIPS Workshop. No. EPFL-CONF-192376. 2011, 6 pages.
Diamond, Jared, "Zebras and the Anna Karenina principle," Natural History, Sep. 1994, 103(9):4, 8 pages.
Felzenszwalb et al., "A discriminatively trained, multiscale, deformable part model," Computer Vision and Pattern Recognition, 2008. CVPR 2008. IEEE Conference on. IEEE, 2008, 8 pages.
Forbes et al. "Real-Time reinforcement learning in continuous domains," AAAI Spring Symposium on Real-Time Autonomous Systems, Mar. 20, 2000, 3 pages.
Foster and Wilson, "Reverse replay of behavioral sequences in hippocampal place cells during the awake state," Nature, Mar. 2006, 440(7084):680-Q83, 4 pages.
Galar et al., A review on ensembles for the class imbalance problem: bagging-, boosting-, and hybrid based approaches. IEEE Transactions on Systems, Man, and Cybernetics, Pan C: Applications and Reviews, Jul. 2012, 42(4):463-484.
Geramifard et al., "Online discovery of feature dependencies," In Proceedings of the 28th International Conference on Machine Learning (ICML-11), 2011, pp. 881-888.
Guo et al., "Deep Learning for Real-Time Atari Game Play Using Offline Monte-Carlo Tree Search Planning," In Advances in Neural Information Processing Systems, 2014, 9 pages.
Hinton, Geoffrey E., "To recognize shapes, first learn to generate images," Progress in brain research, 2007, 165:535-547.
Hsu et al. "A fast learning agent based on the Dyna architecture," Journal of Information Science and Engineering, col. 30, No. 6, Nov. 2014, 17 pages.
International Search Report and Written Opinion in International Application No. PCT/US2016/061693, dated Mar. 9, 2017, 15 pages.
Kingma and Ba, "Adam: A method for stochastic optimization," Advances Seminar in Deep Learning (#67679), The Hebrew University of Jerusalem, Oct. 18, 2015, 41 pages.
Lecun et al., "Gradient-based learning applied to document recognition," Proceedings of the IEEE, Nov. 1998, 86(11):2278-2324.
LeCun et al., "The MNIST database of handwritten digits," 1998, 9 pages.
Lin, Long-Ji, "Self-improving reactive agents based on reinforcement learning, planning and teaching," Machine learning, 1992, 8(34):293-321.
Mahmood et al., "Weighted importance sampling for off-policy learning with linear function approximation," In Advances in Neural Information Processing Systems, 2014, 3014-3022.

McNamara et al., "Doparninergic neurons promote hippocampal reactivation and spatial memory persistence," Nature neuroscience, Dec. 2014, 17(12):1658-1660.
Mnih et al., "Human-level control through deep reinforcement Learning," Nature, 2015, 518(7540):529-533.
Mnih et al., "Playing atari with deep reinforcement learning," arXiv preprint arXiv:1312.5602, 2013, 9 pages.
Moore et al., "Prioritized sweeping: Reinforcement learning with less data and less time," Machine Learning, 1993, 13(1):103-130.
Nair et al., "Massively parallel methods for deep reinforcement learning," arXiv preprint arXiv:1507.04296, 2015, 14 pages.
Narasimhan et al. "Language understanding for text-based games using deep reinforcement learning," Proceedings of the 2015 Conference on Empirical Methods in Natural Language Processing, Sep. 17, 2015, 12 pages.
Narasimhan et al., "Language understanding for text-based games using deep reinforcement learning," arXiv preprint arXiv:1506.08941, 2015, 11 pages.
Olafsdottir et al., "Hippocampal place cells construct reward related sequences through unexplored space," Elife, 2015;4e06063, 17 pages.
Riedmiller, Martin. Rprop-description and implementation details. Jan. 1994, 2 pages.
Rosin and Belew, "New methods for competitive coevolution," Evolutionary Computation, 1997, 5(1):1-29.
Schaul et al., "Prioritized experience replay," arXiv preprint arXiv:1511.05952, 2015, 23 pages.
Schaul et al., "No more pesky learning rates," ICML (3) 28 (2013): 343-351.
Schmidhuber, Jiirgen, "Curious model-building control systems," In Neural Networks, 1991. 1991 IEEE International Joint Conference on, IEEE, 1991, 2:1458-1463.
Singer and Frank, "Rewarded outcomes enhance reactivation of experience in the hippocampus," Neuron, Dec. 2009, 64(6):910-921.
Stadie et al., "Incentivizing exploration in reinforcement learning with deep predictive models," arXiv preprint arXiv:1507.00814, 2015, 10 pages.
Sun et al., "Incremental basis construction from temporal difference error," In Proceedings of the 28th International Conference on Machine Learning (ICML-11), 2011, pp. 481-488.
van Hasselt et al., "Deep Reinforcement Learning with Double Q-learning," In Proceedings of the Thirtieth AAA/ Conference on Artificial Intelligence, 2016. URL http://arxiv.org/abs/1509.06461, 7 pages.
van Hasselt, Hado. Double Q-learning, In Advances in Neural Information Processing Systems, 2010, pp. 2613-2621.
van Seijen and Sutton, "Planning by prioritized sweeping with small backups," In Proceedings of the 30th International Conference on Machine Learning, 2013, arXiv:1301.2343v1, pp. 361-369.
Van Seijen et al. "A deeper look at planning as learning from replay Harm van Seijen," JMLR Workshop and Conference Proceedings, vol. 31, Jun. 1, 2015, 9 pages.
Wang et al., "Dueling network architectures for deep reinforcement Learning," Technical report, arXiv preprint arXiv:1511.06581, 2015, 15 pages.
Watkins and Dayan, "Q-learning," Machine learning, 1992, 8(3-4):279-292.
White et al., "Surprise and curiosity for big data robotics," In Workshops at the Twenty-Eighth AAA Conference on Artificial Intelligence, 2014, pp. 19-23.
Zajdel. "Epoch-incremental reinforcement learning algorithms," International Journal of Applied Mathematics and Computer Science, vol. 23, No. 3, Sep. 30, 2013, 13 pages.

* cited by examiner

TRAINING NEURAL NETWORKS USING A PRIORITIZED EXPERIENCE MEMORY

CROSS-REFERENCE TO RELATED APPLICATIONS

This is a continuation of U.S. application Ser. No. 15/349,894, filed on Nov. 11, 2016, which claims priority to U.S. Provisional Application No. 62/254,610, filed on Nov. 12, 2015. The disclosures of the prior applications are considered part of and are incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for training a neural network used to select actions performed by a reinforcement learning agent interacting with an environment by performing actions that cause the environment to transition states, where the methods include the actions of maintaining a replay memory storing pieces of experience data generated as a result of the reinforcement learning agent interacting with the environment, wherein the pieces of experience data each have a respective expected learning progress measure that is a measure of an expected amount of progress made in the training of the neural network if the neural network is trained on the piece of experience data; selecting a piece of experience data from the replay memory by prioritizing for selection pieces of experience data having relatively higher expected learning progress measures; and training the neural network on the selected piece of experience data.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Implementations can include one or more of the following features. In some implementations, selecting the piece of experience data includes: (i) determining a respective probability for each piece of experience data such that pieces of experience data having higher expected learning progress measures have higher probabilities than pieces of experience data having relatively lower expected learning progress measures; and (ii) sampling a piece of experience data in accordance with the determined probabilities.

In some implementations, the probability PQ) for a piece of experience data i satisfies:

$$P(i) = \frac{p_i^\alpha}{\sum_k p_k^\alpha}$$

where $\alpha$ is a predetermined constant, k ranges across the pieces of experience data in the replay memory, and $p_i$ is a priority for the piece of experience data i derived from the expected learning progress measure for the piece of experience data i.

In some implementations, the priority is the expected learning measure plus a constant value. In some implementations, the priority is a fraction having a predetermined positive value as a numerator and a rank of the piece of experience data i in a ranking of the pieces of experience data in the replay memory according to their expected learning progress measures as a denominator. In some implementations, the priority is set to a maximum value for a piece of experience data that has not yet been used in training.

In some implementations, each piece of experience data is an experience tuple that includes a respective current observation characterizing a respective current state of the environment, a respective current action performed by the agent in response to the current observation, a respective next state characterizing a respective next state of the environment, and a reward received in response to the agent performing the current action.

In some implementations, training the neural network on the selected piece of experience data includes determining a temporal difference learning error for the selected experience tuple and using the temporal difference learning error in adjusting values of the parameters of the neural network.

In some implementations, using the temporal difference learning error in adjusting the values of the parameters includes determining a weight for the temporal difference learning error using the expected learning progress measure for the selected experience tuple; adjusting the temporal difference learning error using the weight; and using the adjusted temporal difference learning error as a target error for adjusting the values of the parameters of the neural network.

In some implementations, the methods further include annealing an exponent used in computing the weight during the training of the neural network.

In some implementations, the expected learning progress measure for each experience tuple in the replay memory is an absolute value of a temporal difference learning error determined for the experience tuple the preceding time the experience tuple was used in training the neural network.

In some implementations, the expected learning progress measure for each experience tuple in the replay memory is a derivative of an absolute value of a temporal difference learning error determined for the experience tuple the preceding time the experience tuple was used in training the neural network.

In some implementations, the expected learning progress measure for each experience tuple in the replay memory is a norm of an induced weight-change by using the experience tuple to train the neural network.

In some implementations, the methods further include determining when to delete pieces of experience data from the replay memory using the expected learning progress measures.

The subject matter described in this specification can be implemented in particular embodiments so as to realize one or more of the following advantages. Training data from a replay memory can be selected in a way that increases the value of the selected data for training a neural network. This can, in turn, increase the speed of training of neural networks used in selecting actions to be performed by agents and reduce the amount of training data needed to effectively train those neural networks. Thus, the amount of computing resources necessary for the training of the neural networks can be reduced. For example, the amount of memory required for storing the training data can be reduced, the amount of processing resources used by the training process can be reduced, or both. The increased speed of training of neural networks can be especially significant for complex neural networks that are harder to train or for training neural networks to select actions to be performed by agents performing complex reinforcement learning tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order for the agent to interact with the environment, the system receives data characterizing the current state of the environment and selects an action from a predetermined set of actions to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

Figure 1:
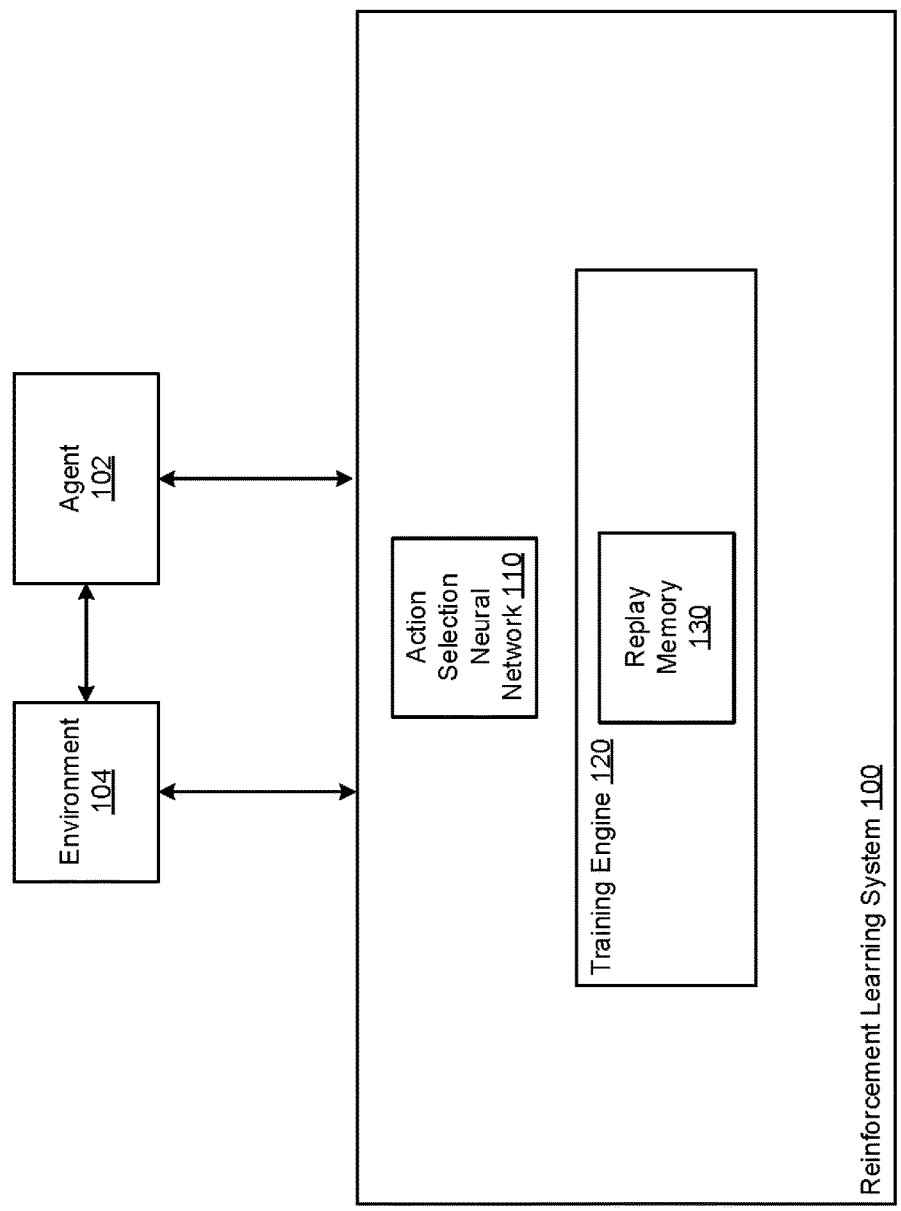
FIG. 1 shows an example reinforcement learning system.

FIG. 1 shows an example reinforcement learning system 100. The reinforcement learning system 100 is an example of a system implemented as computer programs on one or more computers in one or more locations, in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from a predetermined set of actions to be performed by the reinforcement learning agent 102 in response to the observation. In response to some or all of the actions performed by the agent 102, the reinforcement learning system 100 receives a reward. Each reward is a numeric value received from the environment 104 as a consequence of the agent performing an action, i.e., the reward will be different depending on the state that the environment 104 transitions into as a result of the agent 102 performing the action. In particular, the reinforcement learning system 100 selects actions to be performed by the agent 102 using an action selection neural network 110 and a training engine 120.

The action selection neural network 110 is a neural network that receives as an input an observation about the state of the environment 104 and generates as an output a respective Q value for each action, i.e., a prediction of expected return resulting from the agent 102 performing the action in response to the observation.

To allow the agent 102 to effectively interact with the environment 104, the reinforcement learning system 100 includes a training engine 120 that trains the action selection neural network 110 to determine trained values of the parameters of the action selection neural network 110.

To assist in the training of the action selection neural network, the training engine 120 maintains a replay memory 130.

The replay memory 130 stores pieces of experience data generated as a consequence of the interaction of the agent 102 or another agent with the environment 104 or with another instance of the environment for use in training the action selection network 110.

The training engine 120 trains the action selection neural network 110 by repeatedly selecting pieces of experience data from the replay memory 130 and training the action selection neural network 110 on the selected pieces of experience data. Training the action selection neural network 110 using the experience data in the replay memory 130 is described in more detail below with reference to FIGS. 2 and 3.

Figure 2:
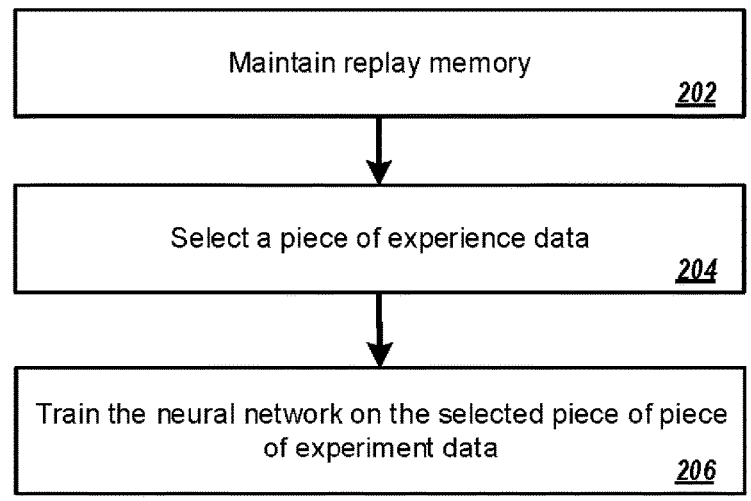
FIG. 2 is a flow chart an example process for training a neural network using a replay memory.

FIG. 2 is a flow chart of an example process 200 for training a neural network using a replay memory. For convenience, the process 200 will be described as being performed by a system of one or more computers located in one or more locations. For example, a reinforcing learning system, e.g., the reinforcing learning system 100 of FIG. 1, appropriately programmed in accordance with this specification, can perform the process 200.

The system maintains a replay memory (202). The replay memory stores pieces of experience data generated as a result of the agent interacting with the environment. Each piece of experience data represents information about an interaction of the agent with the environment.

In some implementations, each piece of experience data is an experience tuple that includes: (1) a current observation characterizing the current state of the environment at one time; (2) a current action performed by the agent in response to the current observation; (3) a next observation characterizing the next state of the environment after the agent performs the current action, i.e., a state that the environment transitioned into as a result of the agent performing the current action; and (4) a reward received in response to the agent performing the current action.

The system also maintains (in the replay memory or in a separate storage component) an expected learning progress measure for some or all of the pieces of experience data. An expected learning progress measure associated with a piece of experience data is a measure of the expected amount of progress made in the training of the neural network if the neural network is trained using the piece of experience data. In other words, the expected learning progress measure is an indication of how much a neural network can expect to learn from a piece of experience data.

In some implementations, the system determines an expected learning progress measure associated with an experience tuple based on a previously calculated temporal difference error for the experience tuple, i.e., the temporal difference error from the preceding time the experience tuple was used in training the neural network. Determining a temporal difference error for an experience tuple is described in more detail below with reference to FIG. 3.

In some implementations, the expected learning progress measure is an absolute value of the temporal difference learning error determined for the experience tuple the preceding time the experience tuple was used in training the neural network. In some implementations, the expected learning progress measure is derivative of an absolute value of a temporal difference learning error determined for the experience tuple the preceding time the experience tuple was used in training the neural network.

In some implementations, the expected learning progress measure associated with an experience tuple is an adjusted measure of the absolute value of a previously calculated temporal difference learning error for the experience tuple. The adjustment of temporal difference errors is configured so that for two experience tuples whose absolute value of previously-calculated temporal difference learning error are equal, the tuple whose temporal difference learning error has a positive value will have a higher expected learning progress measure.

In some implementations, the expected learning progress measure for each experience tuple in the replay memory is a norm of an induced weight-change resulting from using the experience tuple to train the neural network.

The system selects a piece of experience data from the replay memory (204). In selecting the piece of experience data, the system prioritizes the selection of pieces of experience data having relatively higher expected learning progress measures relative to other pieces of experience data in the replay memory.

In some implementations, the system determines a respective probability for each piece of experience data using the expected learning progress measures and samples a piece of experience data in accordance with the determined probabilities. Sampling experience data in accordance with determined probabilities is described in more detail below with reference to FIG. 3.

The system trains the neural network on the selected piece of experience data (206). In some implementations, the system uses the selected piece of experience data to adjust the values of the parameters of the neural network. Training neural networks on experience data is described in further detail below with reference to FIG. 4.

In some implementations, during the training of the neural network, the system determines when to delete pieces of experience data from the replay memory using the expected learning progress measures.

In some of these implementations, the system determines to delete a piece of experience data when the respective expected learning measure associated with the piece of experience data falls below a threshold value. The threshold value may be a predetermined constant value or a function of a measure of central tendency, e.g., a mean or a median, of the expected learning measures of pieces of experience data in the memory replay.

In others of these implementations, the system determines to delete a piece of experience data when a value derived at least in part from the expected learning progress measure of the experience data (e.g., a probability or priority for the piece of experience data) falls below a threshold value.

Figure 3:
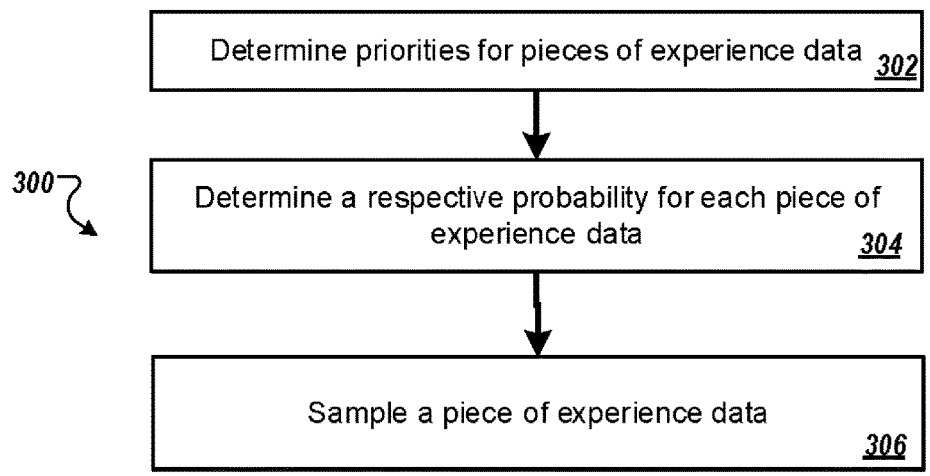
FIG. 3 is a flow chart of an example process for sampling experience data based on determined probabilities of experience data.

FIG. 3 is a flow chart of an example process 300 for sampling experience data based on determined probabilities of experience data. For convenience, the process 300 will be described as being performed by a system of one or more computers located in one or more locations. For example, a reinforcing learning system, e.g., the reinforcing learning system 100 of FIG. 1, appropriately programmed in accordance with this specification, can perform the process 300.

The system determines a respective priority for each piece of experience data (302). In particular, the system determines the priority for each piece of experience data based on the expected learning measure of the piece of experience data.

In some implementations, the priority for a piece of experience data is the expected learning measure of the piece of experience data plus a constant value.

In some other implementations, the priority for a piece of experience data is a fraction having a predetermined positive value as a numerator and a rank of the piece of experience data in a ranking of the pieces of experience data in the replay memory according to their expected learning progress measures as a denominator.

In some implementations, when a new experience tuple without a prior measure of temporal difference learning error is added to the replay memory, the system assigns a measure of maximum priority to the tuple, i.e., assigns the experience tuple a priority that is the maximum possible priority that can be determined for any experience tuple according to how the system determines the priorities. This increases the likelihood that the system uses all experience tuples in training at least once.

The system determines a probability for each piece of experience data (304). The system sets probabilities for pieces of experience data such that pieces of experience data having higher expected learning progress measures have higher probabilities than pieces of experience data having relatively lower expected learning progress measures. In particular, the system determines the probability for each piece of experience data based on the priority for the piece of experience data.

In some implementations, the probability P(i) for a piece of experience data i satisfies:

$$P(i) = \frac{p_i^\alpha}{\sum_k p_k^\alpha}$$

where α is a predetermined constant, k ranges across the pieces of experience data in the replay memory, and $p_i$ is the priority for the piece of experience data i.

In some implementations, the constant α is a measure of how much prioritization of pieces of experience data should be used in sampling pieces of experience data. As such, when α=0, no prioritization is implemented. As a increases, the priority $p_i$ for the piece of experience data i becomes a more important factor in determining the probability P(i) for the piece of experience data.

The system samples a piece of experience data from the replay memory (306). The system performs the sampling in accordance with the determined probabilities of pieces of experience data. In some implementations, the system samples one or more pieces of experience with the highest determined probabilities. In some other implementations, the system samples each piece of experience data with a probability equal to the determined probability for the piece of experience data.

Figure 4:
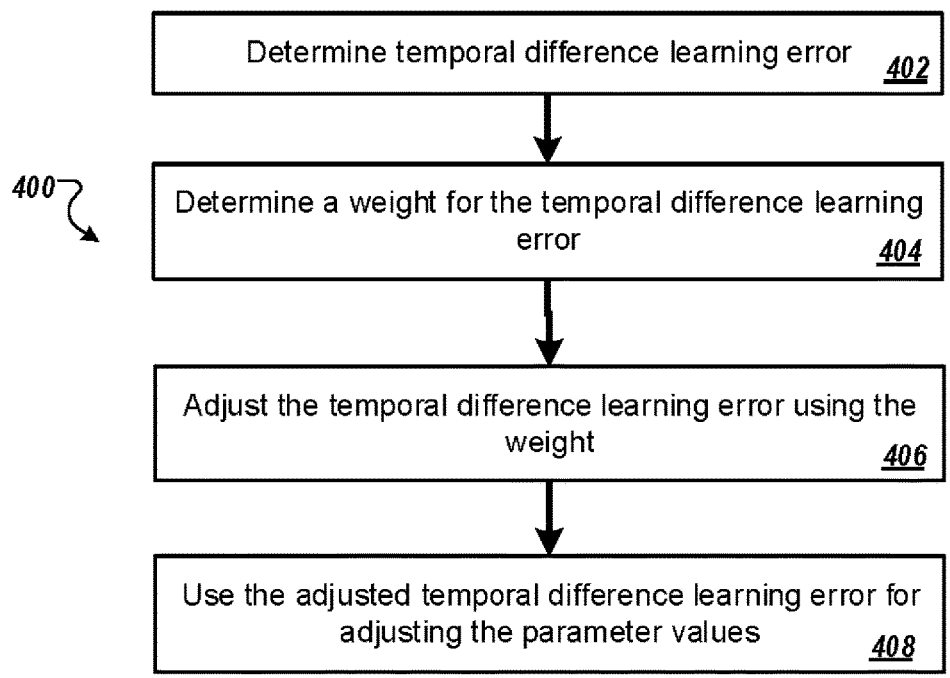
FIG. 4 is a flow chart of an example process for training a neural network on an experience tuple.

FIG. 4 is a flow chart for an example process 400 for training a neural network on an experience tuple. For convenience, the process 400 will be described as being performed by a system of one or more computers located in one or more locations. For example, a reinforcing learning system, e.g., the reinforcing learning system 100 of FIG. 1, appropriately programmed in accordance with this specification, can perform the process 400.

The system determines a temporal difference learning error for an experience tuple (402). The temporal difference error associated with a current experience tuple can be the difference between: (i) a current expected return as determined by the neural network if the current action in the tuple is performed in response to the current observation in the tuple; and (ii) the sum of: (a) a time-discounted next expected return if a next action is performed in response to the next observation in the tuple and (b) the reward in the tuple.

The manner in which the system selects the next action and determines the next expected return is dependent on the reinforcement learning algorithm being used to train the neural network. For example, in a deep Q learning technique, the system selects as the next action the action that, when provided as input to a target neural network in combination with the next observation, results in the target neural network outputting the highest Q value and uses the Q value for the next action that is generated by the target neural network as the next return. As another example, in a double deep Q learning technique, the system selects as the next action the action that, when provided as input to the neural network in combination with the next observation, results in the target neural network outputting the highest Q value and uses the Q value generated by providing the next action and the next observation as input to the target neural network as the next return. As yet another example, in a Sarsa learning technique, the next action is the action that was actually performed by the agent in response to the next observation, and the next return is the Q value generated by providing the next action and the next observation as input to the target neural network. The target neural network is a neural network that has the same architecture as the action selection neural network, but that may have different parameters.

The system determines a weight for the temporal difference learning error (404). In some implementations, the weight $w_i$ for the temporal difference learning error for the experience tuple i satisfies:

$$w_i = \left(\frac{1}{N} \cdot \frac{1}{P(i)}\right)^\beta$$

where N is the number of experience tuples in the replay memory, P(i) is the probability for experience tuple i, and β is a bias factor.

In some implementations, the bias factor is a predetermined constant value. In some other implementations, the system anneals an exponent used in computing the weight (e.g., the bias factor β) during the training of neural network. In some implementations, the system linearly anneals the exponent from its predetermined initial value to 1 during the training of the neural network.

The system adjusts the temporal difference learning error using the weight (406). In some implementations, the system adjusts the temporal difference learning error by multiplying the error by the weight.

The system uses the adjusted temporal difference learning error in adjusting the parameter values of the neural network (408). In some implementations, the system uses the adjusted temporal difference learning error as a target error for adjusting the values of the parameters of the neural network as part of a conventional reinforcement learning technique, e.g., Sarsa, deep Q-learning, or double deep Q-learning.

In some implementations, the system uses the temporal difference learning error only in selecting experience data from the replay memory and not to weight the temporal difference learning error during training. That is, in some implementations, rather than use the adjusted temporal difference learning error as described above with FIG. 4, the system instead uses the temporal difference learning error directly to adjust the parameter values.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a neural network used to select actions performed by a reinforcement learning agent interacting with an environment by performing actions that cause the environment to transition states, the method comprising:
    maintaining a replay memory, the replay memory storing pieces of experience data for use in training the neural network, wherein:
    each piece of experience data has been generated as a result of the reinforcement learning agent interacting with the environment,
    each piece of experience data comprises a respective current observation characterizing a respective current state of the environment, a respective current action performed by the agent in response to the current observation, a respective next observation characterizing a respective next state of the environment, and a reward received in response to the agent performing the current action,
    a plurality of the pieces of experience data are each associated with a respective expected learning progress measure that (i) is a measure of an expected amount of progress that would be made in the training of the neural network if the neural network is trained on the piece of experience data and (ii) is derived from a result of a preceding time that the piece of experience data was used in training the neural network;
    selecting a piece of experience data from the replay memory by prioritizing for selection pieces of experience data having relatively higher expected learning progress measures, comprising:
    determining, based on the respective expected learning progress measures for the pieces of experience data, a respective probability for each of the pieces of experience data in the replay memory, and
    sampling a piece of experience data from the replay memory in accordance with the determined probabilities;
    training, using a reinforcement learning technique, the neural network on the selected piece of experience data; and
    associating, in the replay memory, the selected piece of experience data with a new expected learning progress measure derived from a result of training the neural network on the selected piece of experience data.

2. The method of claim 1, wherein determining, based on the respective expected learning progress measures for the pieces of experience data, a respective probability for each of the pieces of experience data in the replay memory comprises:
    determining a respective probability for each piece of experience data such that pieces of experience data having higher expected learning progress measures have higher probabilities than pieces of experience data having relatively lower expected learning progress measures.

3. The method of claim 2, wherein the probability P(i) for a piece of experience data i satisfies:

$$P(i) = \frac{p_i^\alpha}{\sum_k p_k^\alpha}$$

where α is a predetermined constant, k ranges across the pieces of experience data in the replay memory, and $p_i$ is a priority for the piece of experience data i derived from the expected learning progress measure for the piece of experience data i.

4. The method of claim 3, wherein the priority is the expected learning measure plus a constant value.

5. The method of claim 3, wherein the priority is a fraction having a predetermined positive value as a numerator and a rank of the piece of experience data i in a ranking of the pieces of experience data in the replay memory according to their expected learning progress measures as a denominator.

6. The method of claim 3, wherein the priority is set to a maximum value for a piece of experience data that has not yet been used in training in the neural network.

7. The method of claim 1, wherein training the neural network on the selected piece of experience data comprises:
    determining a temporal difference learning error for the selected piece of experience data; and
    using the temporal difference learning error in adjusting values of the parameters of the neural network.

8. The method of claim 7, wherein using the temporal difference learning error in adjusting the values of the parameters comprises:
    determining a weight for the temporal difference learning error using the expected learning progress measure for the selected piece of experience data;
    adjusting the temporal difference learning error using the weight; and
    using the adjusted temporal difference learning error as a target error for adjusting the values of the parameters of the neural network.

9. The method of claim 8, further comprising annealing an exponent used in computing the weight during the training of the neural network.

10. The method of claim 1, wherein the expected learning progress measure for each piece of experience data in the replay memory is an absolute value of a temporal difference learning error determined for the piece of experience data the preceding time the experience tuple was used in training the neural network.

11. The method of claim 1, wherein the expected learning progress measure for each piece of experience data in the replay memory is a derivative of an absolute value of a temporal difference learning error determined for the piece of experience data the preceding time the experience tuple was used in training the neural network.

12. The method of claim 1, wherein the expected learning progress measure for each piece of experience data in the replay memory is a norm of an induced weight-change by using the piece of experience data to train the neural network.

13. The method of claim 1, further comprising:
determining when to delete pieces of experience data from the replay memory using the expected learning progress measures.

14. The method of claim 13, further comprising:
determining that (i) an expected progress measure for a particular piece of experience data or (ii) a value derived from the expected progress measure for the particular piece of experience data falls below a threshold; and
in response, deleting the particular piece of experience data from the replay memory.

15. The method of claim 1, further comprising:
controlling the reinforcement learning agent using the neural network while the reinforcement learning agent interacts with the environment.

16. A system comprising one or more computers and one or more storage devices storing instructions that are operable, when executed by the one or more computers, to cause the one or more computers to perform operations for a method for training a neural network used to select actions performed by a reinforcement learning agent interacting with an environment by performing actions that cause the environment to transition states, the method comprising:
maintaining a replay memory, the replay memory storing pieces of experience data for use in training the neural network, wherein:
each piece of experience data has been generated as a result of the reinforcement learning agent interacting with the environment,
each piece of experience data comprises a respective current observation characterizing a respective current state of the environment, a respective current action performed by the agent in response to the current observation, a respective next observation characterizing a respective next state of the environment, and a reward received in response to the agent performing the current action,
a plurality of the pieces of experience data are each associated with a respective expected learning progress measure that (i) is a measure of an expected amount of progress that would be made in the training of the neural network if the neural network is trained on the piece of experience data and (ii) is derived from a result of a preceding time that the piece of experience data was used in training the neural network;
selecting a piece of experience data from the replay memory by prioritizing for selection pieces of experience data having relatively higher expected learning progress measures, comprising:
determining, based on the respective expected learning progress measures for the pieces of experience data, a respective probability for each of the pieces of experience data in the replay memory, and
sampling a piece of experience data from the replay memory in accordance with the determined probabilities;
training, using a reinforcement learning technique, the neural network on the selected piece of experience data; and
associating, in the replay memory, the selected piece of experience data with a new expected learning progress measure derived from a result of training the neural network on the selected piece of experience data.

17. The system of claim 16, determining, based on the respective expected learning progress measures for the pieces of experience data, a respective probability for each of the pieces of experience data in the replay memory comprises:
determining a respective probability for each piece of experience data such that pieces of experience data having higher expected learning progress measures have higher probabilities than pieces of experience data having relatively lower expected learning progress measures.

18. The system of claim 17, wherein the probability P(i) for a piece of experience data i satisfies:

$$P(i) = \frac{p_i^\alpha}{\sum_k p_k^\alpha}$$

where $\alpha$ is a predetermined constant, k ranges across the pieces of experience data in the replay memory, and $p_i$ is a priority for the piece of experience data i derived from the expected learning progress measure for the piece of experience data i.

19. The system of claim 17, wherein training the neural network on the selected piece of experience data comprises:
determining a temporal difference learning error for the selected piece of experience data; and
using the temporal difference learning error in adjusting values of the parameters of the neural network.

20. A non-transitory computer storage medium encoded with instructions that, when executed by one or more computers, cause the one or more computers to perform operations for training a neural network used to select actions performed by a reinforcement learning agent interacting with an environment by performing actions that cause the environment to transition states, the operations comprising:
maintaining a replay memory, the replay memory storing pieces of experience data for use in training the neural network, wherein:
each piece of experience data has been generated as a result of the reinforcement learning agent interacting with the environment,
each piece of experience data comprises a respective current observation characterizing a respective current state of the environment, a respective current action performed by the agent in response to the current observation, a respective next observation characterizing a respective next state of the environment, and a reward received in response to the agent performing the current action,
a plurality of the pieces of experience data are each associated with a respective expected learning progress measure that (i) is a measure of an expected amount of progress that would be made in the training of the neural network if the neural network is trained on the piece of experience data and (ii) is derived from a result of a preceding time that the piece of experience data was used in training the neural network;

selecting a piece of experience data from the replay memory by prioritizing for selection pieces of experience data having relatively higher expected learning progress measures, comprising:

determining, based on the respective expected learning progress measures for the pieces of experience data, a respective probability for each of the pieces of experience data in the replay memory, and sampling a piece of experience data from the replay memory in accordance with the determined probabilities;

training, using a reinforcement learning technique, the neural network on the selected piece of experience data; and associating, in the replay memory, the selected piece of experience data with a new expected learning progress measure derived from a result of training the neural network on the selected piece of experience data.

\* \* \* \* \*